United States Patent [19]

Rice

[11] 4,172,491
[45] Oct. 30, 1979

[54] METHOD OF MORE EFFICIENTLY OPERATING A HEAT STORAGE-HEAT EXCHANGE SYSTEM

[75] Inventor: Richard E. Rice, Arlington, Mass.

[73] Assignee: Hooker Chemicals & Plastics Corp., Niagara Falls, N.Y.

[21] Appl. No.: 875,666

[22] Filed: Feb. 6, 1978

[51] Int. Cl.² ............................................. F28D 21/00
[52] U.S. Cl. ................................... 165/1; 165/104 S; 126/400; 60/659
[58] Field of Search ................ 165/104 S, 1; 126/400; 60/659

[56] References Cited

U.S. PATENT DOCUMENTS

| | | | |
|---|---|---|---|
| 2,933,885 | 4/1960 | Benedek et al. | 60/659 |
| 3,931,806 | 1/1976 | Hayes | 165/104 S X |
| 4,027,821 | 6/1977 | Hayes et al. | 126/400 X |

Primary Examiner—Albert W. Davis, Jr.
Attorney, Agent, or Firm—Peter F. Casella; Howard M. Ellis; James H. Grover

[57] ABSTRACT

A method of operating a heat storage-heat exchange system in a more efficient manner is described. The method comprises the steps of passing a heating fluid through a bed of heat storage medium to heat and create a hotter portion of the medium, passing a fluid to be heated through the medium counter-current to the heating fluid to create a cooler portion of the medium, and passing a fluid from within the system through an intermediate portion of the heat storage medium between the hotter and cooler portions to steepen the temperature gradient between the hotter portion and the cooler portion.

11 Claims, 2 Drawing Figures

METHOD OF MORE EFFICIENTLY OPERATING A HEAT STORAGE-HEAT EXCHANGE SYSTEM

BACKGROUND OF THE INVENTION

The present invention relates of a method of operating a heat storage system in a more efficient manner by altering the thermal gradient within the heat storage unit.

Heat storage units particularly adapted for use in the present invention are those of the heat exchange type which contain a bed of heat storage medium. The heat storage medium may suitably be a heat of fusion type which cycles from solid to liquid and vice versa. Particularly useful are alkali metal hydroxide compositions. Such compositions are particularly well suited because of their high heat storage capacities, high heats of fusion, broad operative ranges, relative inertness, and their low vapor pressures.

Alkli metal hydroxides have melting points ranging from about 272°C. for cesium to about 450° C. for lithium. The incorporation of additives such as corrosion inhibitors and non-reducing agents into the alkali metal hydroxide heat storage compositions facilitates the production of useful mixtures with a variety of melting points. Sodium hydroxide, the most commonly available of the alkali metal hydroxides, is aptly suited to use in compositions useful as the heat storage medium in the present invention. Sodium hydroxide compositions of relatively high purity have a melting point of about 318° C. Such compositions may consist of liquid - solid mixtures in the range of from about 232° to about 340° C. During a heat storage cycle, sodium hydroxide compositions may be heated to temperatures as high as 675° C. without harm. Normal operating temperatures of heat storage units containing sodium hydroxide compositions as a heat storage medium range from about 100° to about 500° C.

In use, the heat storage medium is placed in a container, such as a tank, to form a bed. The container, preferably elongated, is equipped with a plurality of pipes or tubes to facilitate good heat exchange within the container. A heating fluid, suitably water, at a relatively high temperature, is passed longitudinally through the bed of heat storage medium. The heating fluid adds heat to the heat storage medium and exits the container at a temperature lower than that at which it entered. The fluid to be heated, suitably also water, is passed longitudinally through the bed counter current to the flow of the heating fluid. The fluid to be heated enters the bed at a relatively low temperature and exits at a higher temperature. In operation of a heat storage - heat exchange unit, a temperature gradient, a temperature difference, is established within the bed. A relatively cool, or colder zone is formed nearest the incoming fluid to be heated, and a relatively hot zone is formed in the area of the entering heating fluid. As the unit is operated, a temperature gradient is established and tends to spread through the medium bed. Thus, the gradient, or temperature difference, becomes incrementally graduated throughout the bed.

The colder end of the heat storage unit may be viewed as heat storage capacity that is available and unused. In a preferred mode, the present invention facilitates the use of this heat storage capacity.

BRIEF DESCRIPTION OF THE INVENTION

The present invention in a preferred mode provides a method of operating a heat storage - heat exchange system utilizing the normally cooled portion of a heat storage bed, which represents unutilized heat storage capacity, to store heat by passing a heating fluid through an intermediate, cooler portion of the bed, preferably, in a direction opposite that of the normal flow of heating fluid. The temperature gradient through the heat storage medium is altered in a manner that makes the gradient steeper.

In an alternate mode, the temperature gradient may also be altered, if circumstances require, by passing a portion of fluid to be heated through an intermediate, warmer portion of the bed of the heat storage medium, preferably, in a direction opposite that of the normal flow of the fluid to be heated, to remove heat from the bed, which would otherwise not normally be utilized, and in this manner steepen the temperature gradient. This mode is particularly useful when the unit is employed as part of a solar energy heat storage - heat exchange system. During start up of the solar energy collector, a portion of the fluid to be heated may be directed through an intermediate portion of the bed, heated, and the fluid is utilized as a portion of the feed to the solar collector. The preheated feed to the solar collector is advantageously utilized prior to the time the solar collector reaches its maximum heat output, thus allowing the solar collector to reach maximum heat output in a shorter period of time. This mode may be viewed as a means of borrowing of heat from a part of the system that is not being effectively utilized and placing the heat in another portion of the system where it is timely and advantageously used. In this mode, the heat in the storage medium is more effectively utilized; however, the use of the capacity of the bed to store additional heat is not utilized. Combinations of the two modes may be utilized, and the circumstances under which the heat storage - heat exchange system is operated will dictate the best mode to be used.

In heat storage systems involving a solar source it is highly desirable to utilize the intermittently available solar heat as efficiently and effectively as possible to supply a continuous source of heat of relatively constant temperature to a power generator means while simultaneously placing as much heat as possible in storage.

DETAILED DESCRIPTION OF THE INVENTION

The invention may be better understood by reference to the attached drawings which are hereby made part hereof and incorporated herein.

Figure 1:
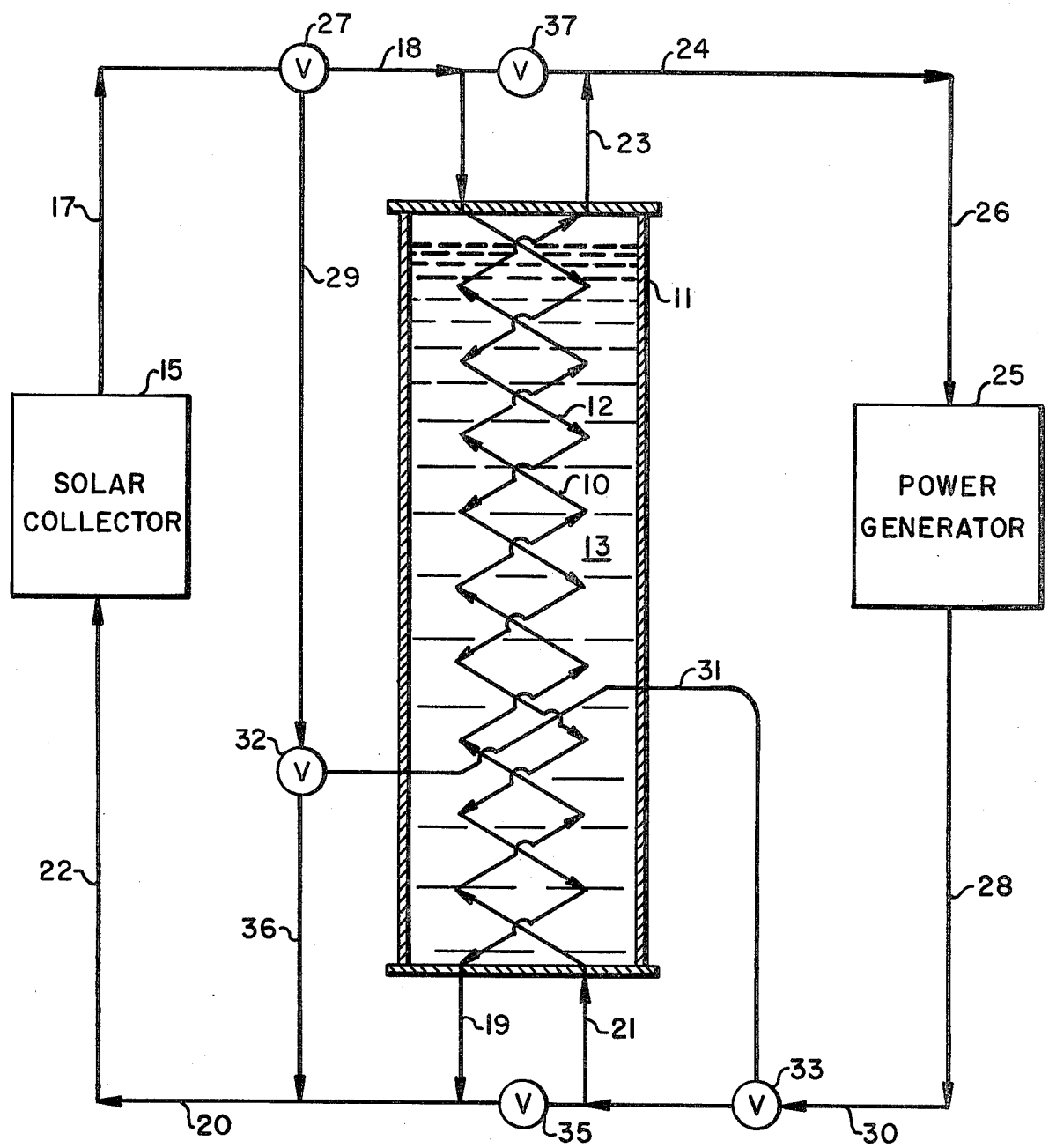
FIG. 1 is a schematic drawing showing the present method utilized in conjunction with a solar source and a power generator.

Looking now at FIG. 1, heat storage container 11 contains an elongated bed of fusible heat storage medium 13. Suitably, heat storage medium 13 is comprised of an alkali metal hydroxide composition. Although, for simplicity, a single elongated heat storage - heat exchange unit is shown in the drawings and will be described, it will be understood that the present invention contemplates that a plurality of separate, smaller units may be utilized in the same manner and in place of a single unit. Heat storage container 11 has an arrangement of pipes or tubes therein, shown by lines 10 and 12, to facilitate a good exchange of heat between the heat storage medium and the streams passing through the unit. Suitable heat exchange units are commercially available, and the internal piping arrangement is not critical to the present method, except that an arrangement yielding good heat exchange is the desired criteria. Solar collector 15 feeds heating fluid through lines 17 and 18 to heat storage container 11. Heating fluid enters container 11 at a relatively high temperature, supplies heat to heat storage medium 13, passes lengthwise through the unit, and exits through line 19 at a lower temperature than the temperature at which it entered. Heating fluid is returned to collector 15 via lines 20 and 22. Fluid to be heated enters heat storage container 11 through line 21 and exits through line 23 at a higher temperature than the temperature at which it entered. Heat fluid in line 23 is fed through lines 24 and 26 to be utilized as feed to power generator 25. The discharge from the power generator 25 is returned through lines 28, 30 and 21 to heat storage container 11.

In accord with a preferred mode of the present method, a portion of stream 17 is diverted, suitably through valve 27, through line 29 and valve 32 into container 11, passing through bed 13, at a point intermediate the temperature gradient, and in a direction counter to the normal flow of heating fluid through the container, exiting through line 13. The fluid in line 31 flows through valve 33, which in this mode may be a check valve through a portion of line 30 into line 20 and line 22.

Although only a single diverted line is shown in the drawing, it will be understood that a plurality of diverted lines may be utilized and desirable and also that the passage of heating fluid through bed 13 may be carried out at any intermediate point of the bed at which the entering heating fluid is at a temperature higher than that of the bed at point of entry. Flow rates may be balanced by means of valve 35. In this mode, valve 37 would normally be closed, but may be utilized to aid in balancing flow rates.

In an alternate mode of the invention, the discharge from power generator 25 in lines 28 and 30 may be diverted through valve 33 to line 31 into heat storage container 11, following an opposite path to that previously described for the heating fluid. In such operation, the entering fluid from line 31 passes through the heat storage medium at any intermediate point of the bed at which the heat storage medium is warmer that the fluid from the power generator discharge. The pre-heated fluid flows through valve 32 to lines 36, 20 and 22 to supply a portion of the feed to solar collector 15. In such mode, flow rates may be adjusted by use of valve 37. In this mode, valve 35 is normally closed, but may be utilized to aid in balancing flow rates.

Figure 2:
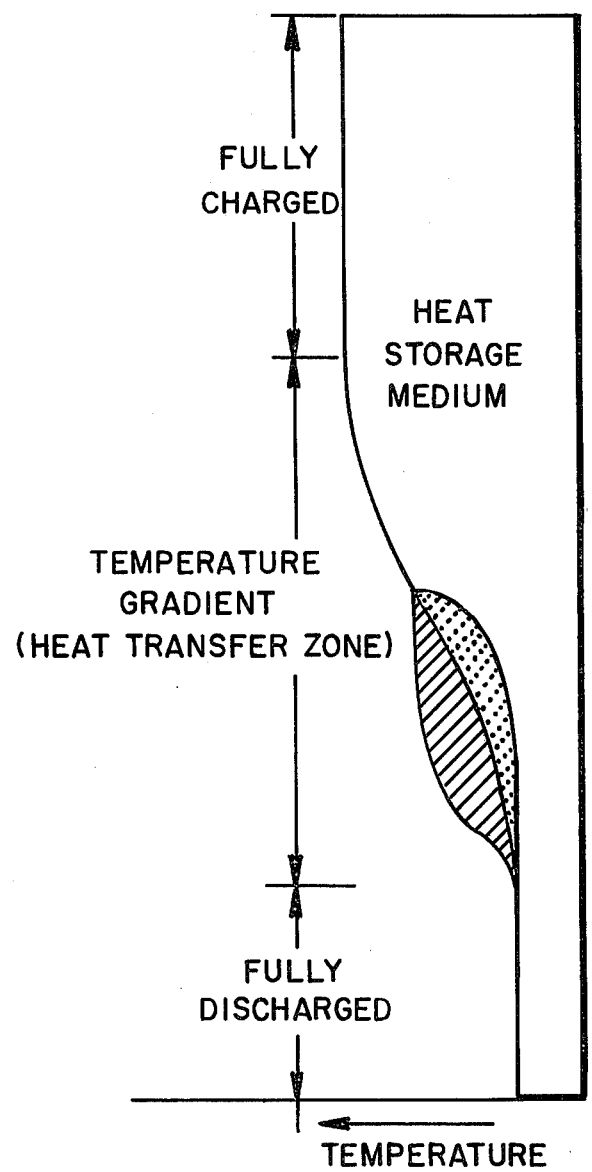
FIG. 2 is a graph of a typical temperature gradient of a heat storage - heat exchange unit such as the unit of FIG. 1, showing the improvement obtained by the use of the present invention.

Looking now at FIG. 2, which is a graph of a typical temperature gradient of a heat storage - heat exchange unit such as that shown in FIG. 1, the lower portion of the heat storage unit is cooled to the point of discharge, and the upper portion is hot and fully charged. The portion between, the heat transfer zone, defines the temperature gradient which extends from the top of the discharge area to the bottom of the fully charged area. When heating fluid is passed through the cooler portion of the heat storage medium, heat is added to the heat storage medium, and the temperature gradient within the unit is altered as shown by the cross-hatched portion of the graph. The altered or steepened temperature gradient graphically demonstrates the use of the normally unused portion of the heat storage bed, thereby increasing the efficiency of the unit and the heat storage capacity of the heat storage bed.

In an alternate mode of the invention, the fluid to be heated is fed through the heat storage medium at an intermediate point to utilize heat in the storage medium which would not normally be utilized. The temperature gradient is negatively altered as shown in the dotted portion of the graph. The altered or steepened temperature gradient graphically demonstrates the timely use of the normally unused portion of the heat storage bed.

The present invention has been described and illustrated in the above specification and examples with reference to several specific embodiments. Such reference has been made for purely illustrative purposes, and various modifications in the details therein included can be made without departing from the scope and spirit of the invention, as will be obvious to those of ordinary skill in the art.

What is claimed is:

1. A method of operating a heat storage - heat exchange system which comprises the steps of:
    (a) passing a heating fluid lengthwise through a bed of heat storage medium to add heat to said bed and thereby forming a hotter portion of said bed,
    (b) passing a fluid to be heated lengthwise through said bed, counter - current to the passage of said heating fluid, thereby forming a colder portion of said bed, and,
    (c) passing a portion of the fluid selected from (a) or (b) through an intermediate portion of said bed to steepen the temperature gradient between said hotter portion and said colder portion of said bed.

2. The method of claim 1 wherein in step (c) a portion of the heating fluid from a) is passed through said colder portion to add heat to said colder portion.

3. The method claim 1 wherein the heating fluid is water.

4. The method of claim 1 wherein the fluid to be heated is water.

5. The method of claim 1 wherein the system is comprised of a single heat storage - heat exchange unit.

6. The method of claim 1 wherein the heat storage medium is an alkali metal hydroxide composition.

7. The method of claim 2 wherein the heating fluid and the fluid to be heated are both water.

8. The method of claim 2 wherein the heating fluid in step (a) and step (c) are from a common source.

9. The method of claim 2 wherein the heating fluid is passed in a direction counter to the flow of the heating fluid in step (a).

10. The method of claim 1 wherein in step (c) a portion of the fluid to be heated from (b) is passed through a hotter portion of said bed to add heat to said fluid to be heated.

11. The method of claim 10 wherein the heated fluid is utilized as a portion of a feed to a solar collector.

* * * * *